US012482976B2

(12) United States Patent
Keith et al.

(10) Patent No.: US 12,482,976 B2
(45) Date of Patent: Nov. 25, 2025

(54) CONNECTOR ARRANGEMENT

(71) Applicant: Siemens Energy Global GmbH & Co. KG, Munich (DE)

(72) Inventors: Philip Keith, Grange-Over-Sands (GB); Scott Spencer, Barrow-in-Furness (GB); Daniel Church, Kirkby-in-Furness (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 396 days.

(21) Appl. No.: 17/980,651

(22) Filed: Nov. 4, 2022

(65) Prior Publication Data

US 2023/0231333 A1 Jul. 20, 2023

(30) Foreign Application Priority Data

Jan. 14, 2022 (GB) ...................................... 2200452

(51) Int. Cl.

| | |
|---|---|
| ***H01R 13/02*** | (2006.01) |
| ***H01R 4/58*** | (2006.01) |
| ***H01R 13/50*** | (2006.01) |
| ***H01R 101/00*** | (2006.01) |

(52) U.S. Cl.

CPC ............. *H01R 13/025* (2013.01); *H01R 4/58* (2013.01); *H01R 13/50* (2013.01); *H01R 2101/00* (2013.01)

(58) Field of Classification Search

CPC ........ H01R 13/58; H01R 13/025; H01R 4/58; H01R 2101/00

USPC .......................................................... 439/660

See application file for complete search history.

(56) References Cited

U.S. PATENT DOCUMENTS

| | | | | |
|---|---|---|---|---|
| 2,416,943 A | 3/1947 | Nicolazzo | | |
| 3,518,606 A * | 6/1970 | Barker | H01B 7/0063 | 338/270 |
| 4,284,322 A * | 8/1981 | Keller | H01R 4/183 | 439/867 |
| 6,077,129 A | 6/2000 | Silfverberg | | |
| 6,638,107 B1 * | 10/2003 | Silfverberg | H01R 13/5205 | 439/275 |
| 2007/0155233 A1 * | 7/2007 | Laerke | H01R 13/622 | 439/578 |

(Continued)

FOREIGN PATENT DOCUMENTS

| | | |
|---|---|---|
| WO | 9737402 A1 | 10/1997 |
| WO | 0129932 A1 | 4/2001 |
| WO | 2006011837 A1 | 2/2006 |

*Primary Examiner* — Christopher M Koehler
*Assistant Examiner* — Gregory L Mangot
(74) *Attorney, Agent, or Firm* — Wolter Van Dyke Davis, PLLC

(57) ABSTRACT

A connector assembly for an electrical connection, the connector assembly includes a plug and a socket. The plug includes a connector and a frame. The connector has a solid core conductor, the solid core conductor has an end portion. The frame surrounds the solid core conductor except for the end portion. The end portion is deformed to overlap the frame. The socket includes a socket conductor and a receiving portion into which the plug engages. The end portion directly contacts the socket conductor to form an electrical contact and causes the frame to deflect and provide a bias to force the end portion and the socket conductor into direct contact with one another.

13 Claims, 3 Drawing Sheets

(56) References Cited

U.S. PATENT DOCUMENTS

| | | | | |
|---|---|---|---|---|
| 2016/0308289 | A1* | 10/2016 | Kumar | H01R 24/86 |
| 2023/0061252 | A1* | 3/2023 | Matsuo | H01R 13/5045 |

* cited by examiner

CONNECTOR ARRANGEMENT

CROSS REFERENCE TO RELATED APPLICATIONS

This application claims the benefit of United Kingdom Application No. GB 2200452.7 filed 14 Jan. 2022, incorporated by reference herein in its entirety.

FIELD OF INVENTION

The present invention relates to a connector arrangement and a method of manufacturing a connector assembly, in particular, but not exclusively, used for connecting conducting cables in subsea environments.

BACKGROUND

A cable conductor must be terminated to the front end of a socket contact of a connector assembly. Soldering the contact is one way, but the soldered joints can be problematic in terms of their quality and longevity. There are a number of different ways to make an electrical connection between a conductor and socket contact without the need for soldering. Crimps are used to provide a direct contact to the conductor. The crimped cable can then be inserted into a socket using an interference fit to provide an electrical connection. However, these kinds of termination are not reliable over a significant temperature range due to the lack of contact force applied to the termination. Crimps are now used to accommodate additional components which improve the reliability of a termination by applying a contact force.

FIG. 1 is a side view of a multilam plug 100 which is made from gold/nickel plated brass. The multilam plug 100 comprises an array of louvres 102 which provide a constant pressure in mated conditions by virtue of their deformation in the radial direction and a spring action. When paired with a crimp, a recess can be incorporated for the multilam to seat and allow for free movement of the contact cage. Multilams form a contact cage between the two desired conductor surfaces and provide a number of contact points, each of which acts as a bridge for the passage of current. These types of connection use a leaf spring principle in 360°.

FIG. 2 is a partial cut-away view of a connector 200 having a canted coil spring 202 and is used in conjunction with crimps to provide an electrical and mechanical connection. The canted coil spring 202 provides a near-constant spring contact force over a range of working conditions and compensates for large mating tolerances and surface irregularities. By using the spring's ability to deflect and produce a radial load, multiple points of contact are created which allows a high current carrying capacity.

FIG. 3 is a side view of 'banana' plug 300 which comprises a radial contact consisting of a monobloc pin 302 fitted with a copper beryllium spring finger 304. This connector provides electrical conduction with a low contact resistance. The spring finger 304 acts like a leaf spring when inserted into a socket to provide a contact point pressure. A conductor is either soldered or crimped into the rear body 306 to complete the termination.

However, these known devices comprise an indirect electrical contact between the conductors of the plug and socket and require crimping or soldering to complete the connection. In other words, known solutions use a metallic part to connect between the conductors of the plug and socket to provide the electrical contact.

Conventional crimps and solders have been found to life-limit connectors, cause quality issue and are additional manufacturing steps.

WO0129932 discloses a cable coupling device which includes a coupling body that has a through passing passageway for receiving an associated end of a cable. The body carries a cup-shaped electric contact whose edge forms a crimping ring that tightly surrounds a body part of reduced diameter. A bared conductor element is placed between the electric contact and the body part. The crimping ring compresses the body so as to seal the wall of the passageway against the cable sheath. A sealing sleeve can bridge two bodies which are each connected to a cable and are conductively coupled via respective electric contacts. The sleeve therewith provides a sealed enclosure of the mutually coupled parts of the cables in a region delimited by the sleeve and the bodies.

WO9737402 discloses a connector for connecting at least one stripped conductor end-part of a cable includes a first body having a through-passing cable transit or channel, and a second body that includes a recess for receiving the first body and the cable end-part, folded down onto the perimeter surface of the first body. The first body is radially deformable in relation to the second body, such as to elastically clamp the conductor end-part between the bodies, wherein the effective perimeter of the body and the conductor end-part is greater than the inner perimeter of the second body. The edge of the cupped second body seals around the first body, and the channel wall of the first body is clamped into sealing abutment with the cable perimeter when the second body is fitted onto the first body.

U.S. Pat. No. 2,416,943 discloses a connector for electrical conductor wires.

WO06011837 discloses a connector for the connection of an electric cable to an electrically conducting sleeve, the electric cable comprising a conductor, which is formed of a plurality of wires, and an insulating casing, which surrounds the conductor, the connector comprising a tubular, elastically deformable body having a throughput channel, which has a first front part that receives the exposed conductor of the cable and has a diameter adapted thereto, and a rear part that has a greater diameter than the front part and receives the front end part of the cable casing, the conductor being bent over around the front end of the body in order to, by the body's front part in the mounting direction, be clamped into contact with the sleeve, the peripheral surface of the body having a conical section in order to, upon insertion into the sleeve, be compressed radially into sealing contact with the outer surface of the cable casing, the body, on the outside thereof, having a circumferential, forwardly facing cavity, and the wires of the conductor being distributed around the outer circumference of the body and having the end portions thereof received in the cavity.

SUMMARY OF INVENTION

Thus, objects of the present invention to improve connector assemblies, reduce manufacturing operations, reduce costs and provide a more robust connector assembly that has a greater longevity of the connector assembly. Another object is to provide a connector assembly that is simple and fool-proof to assemble.

The above objects are achieved by a connector assembly for an electrical connection, the connector assembly comprises a plug and a socket, the plug comprises a connector, the connector comprises an axis, a solid core conductor, the solid core conductor has an end portion and a frame, the frame surrounds the solid core conductor except for the end portion, the end portion is deformed to overlap the frame, the socket comprises a socket conductor and a receiving portion into which the plug engages, the end portion directly contacts the socket conductor to form an electrical contact and causes the frame to deflect from the axis and provide a bias to force the end portion and the socket conductor into direct contact with one another.

The frame may comprise a first portion having a diameter D1, a second portion having a diameter D2 and a third portion having a diameter D3, the receiving portion comprises an inner surface, the inner surface has a diameter D5 which is very slightly larger than the diameter D2 of the second portion such that the second portion fits snugly into contact with the receiving portion, the diameter D3 is smaller than the diameter D5 and the difference between the diameter D5 and diameter D3 is smaller than a diameter D6 of the end portion.

A step may be formed between the first portion and the second portion, the receiving portion has a free end and in a mated condition, the free end abuts the step to limit how far the plug extends into the socket.

The inner surface may have a diameter D5 which is very slightly larger than the diameter D2 of the second portion such that the second portion fits closely into the receiving portion.

The frame may comprise a slot in its radially outer surface, the end portion has a free end, the free end is located at least partly into the slot, the slot has a depth d sufficient such that the free end does not contact the socket connector.

The slot may extend around the circumference of the frame.

The slot may be an aperture in the frame.

The slot may be a groove in the frame.

The socket conductor may extend around the whole circumference of the receiving portion.

The connector assembly may comprise a main body, the plug extends from the main body.

The main body and the plug may be monolithic.

The connector assembly may comprise an array of plugs.

The plug may be formed from a thermoplastic.

In another aspect of the present invention, there is provided a method of manufacturing the connector assembly as described above, the method comprises the step deforming the end portion to overlap the frame.

The method may comprise the step inserting the plug into the socket such that the frame is deflected and provides a biasing force that forces the end portion into contact with the socket conductor.

One advantage of the invention is it allows the solid core conductor to be easily prepared and folded over onto the frame. Another advantage is a 360° landing or contact area between the solid core connector and the socket contact. Another advantage is the solid core conductor may be deformed to overlap the frame at any location around the circumference of the frame. These advantages de-skill the termination procedure, i.e., engaging the plug and socket, and increase the efficiency of the manufacturing process due to its simplicity.

By using the solid core conductor as a direct contact, there is a reduced parts count and a directed connection between the solid core conductor and the socket conductor. With this direct connection the contact resistance measured over the termination is improved.

BRIEF DESCRIPTION OF THE DRAWINGS

The above-mentioned attributes and other features and advantages of the present invention and the manner of attaining them will become more apparent and the present technique itself will be better understood by reference to the following description of embodiments of the present technique taken in conjunction with the accompanying drawings, wherein.

DETAILED DESCRIPTION OF INVENTION

Figure 1:
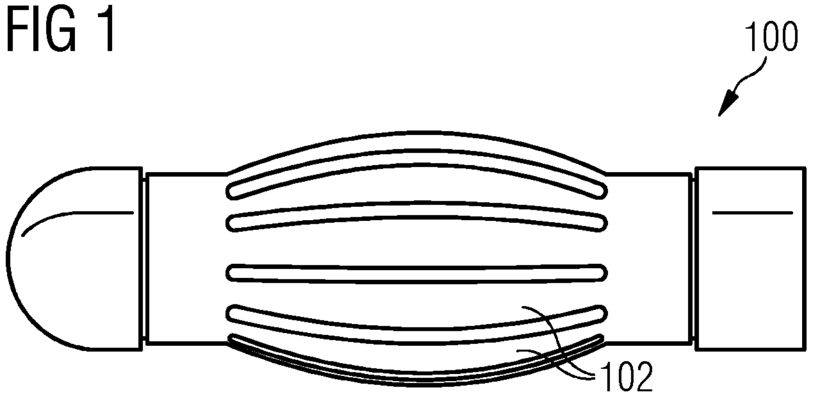
FIG. 1 is a side view of a known multilam plug used in connector assemblies.
Figure 2:
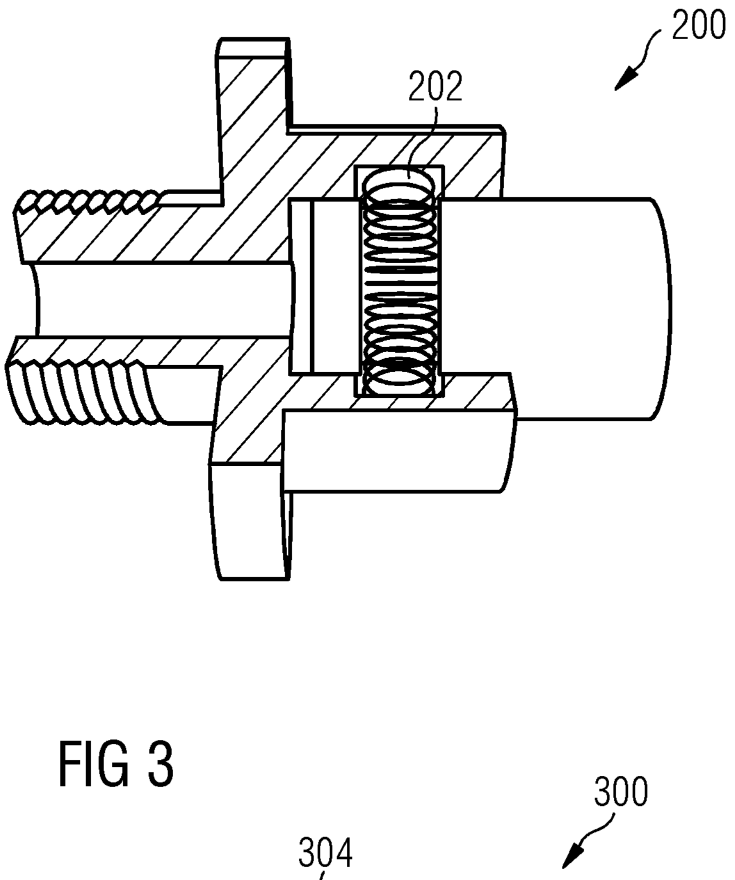
FIG. 2 is a partial cut-away view of a known connector having a canted coil spring that is used in conjunction with crimps to provide an electrical and mechanical connection.
Figure 3:
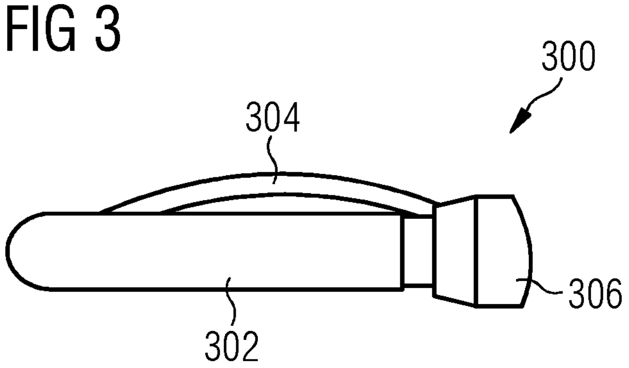
FIG. 3 is a side view of known 'banana' plug which comprises a radial contact consisting of a monobloc pin fitted with a spring finger.
Figure 4:
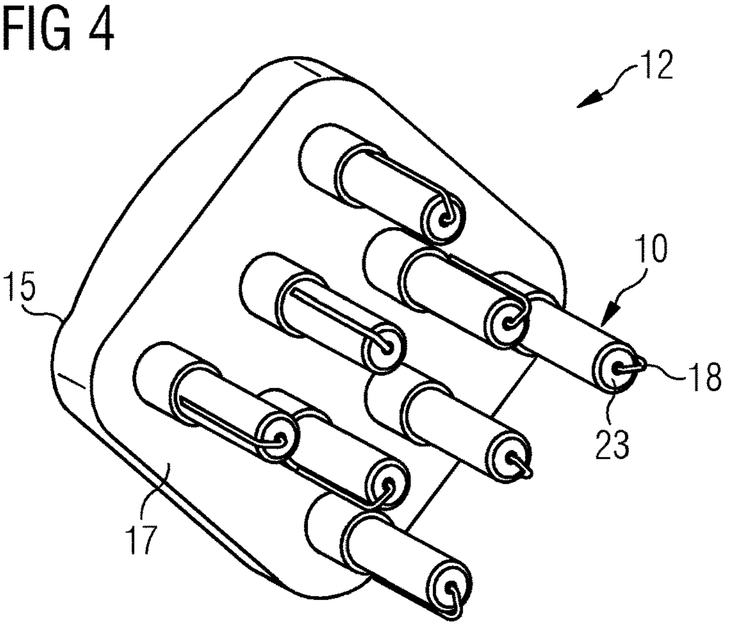
FIG. 4 is a view on a connector assembly having an array of connectors and in accordance with the present invention.
Figure 5:
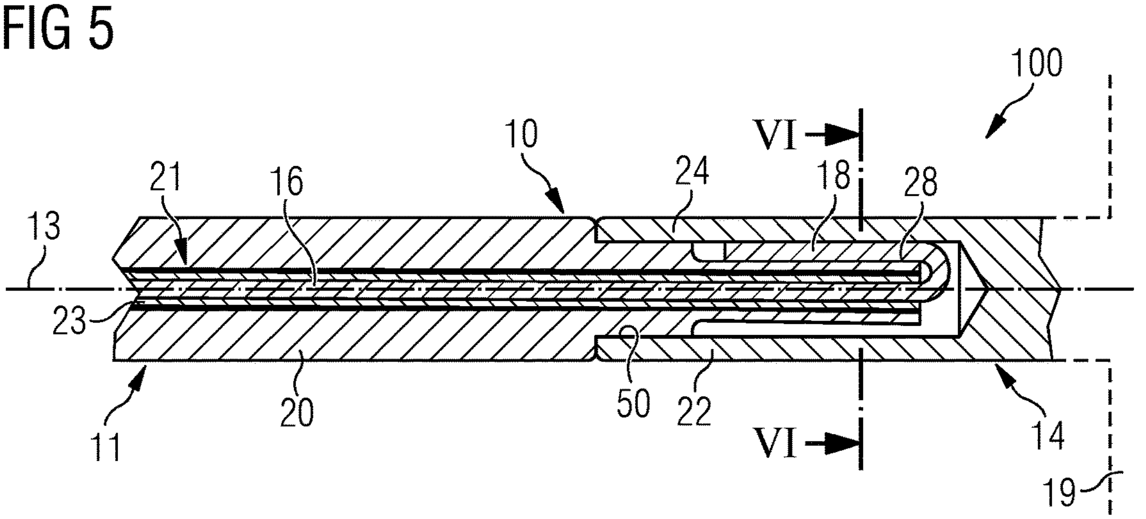
FIG. 5 is a longitudinal section through a connector in accordance with a first embodiment of the present invention.
Figure 6:
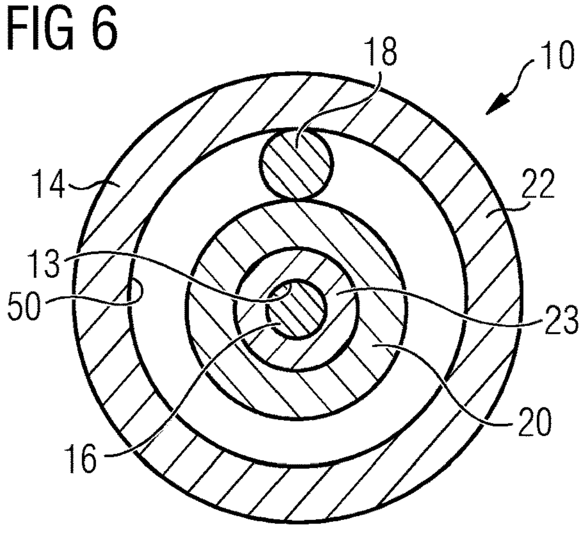
FIG. 6 is a cross-section A-A through the connector of FIG. 4 and in accordance with the present invention.

A first embodiment of the present invention will now be described with reference to FIGS. 4-6. A connector assembly 100 comprises a plug assembly 10 and a socket assembly 19. FIG. 4 shows the plug assembly 12 comprising a main body 15 and an array of plugs 10 which extend from the main body 15. FIG. 5 is an axial or longitudinal section through one of the plugs 10 and a part of one of the sockets 14 of a socket assembly 19. FIG. 6 is a section A-A through the connector assembly 100 as shown in FIG. 5.

The plug 10 forms an electrical connection or connector for a cable 11. Alternatively, or as well as, the connector assembly 100 may transmit other signals such as control signals and data. The plug 10 is a male connector part formed at an end of the cable 11 and engages with the socket 14 or female connector part. The socket 14 is part of a junction box or distribution unit which may be located sub-sea. The plug 10 comprises a cable 21 having an electrically insulating layer 23 surrounding a solid core conductor 16. The solid core conductor 16 is formed from copper or other suitably conductive material. The electrically insulating layer 23 insulates the solid core conductor 16 from electrical leakage and may be made from known material such as silicone or polyethylene; other materials may be used. The plug 10 further comprises a frame 20 which houses the cable 21. The cable 21 passes through the frame 20. The frame 20 is formed from a thermoplastic material although other suitable non-conductive materials can be used dependent on environmental and structural considerations. The frame 20 surrounds the cable 21 except for an end portion 18 of the solid core conductor 16. The electrically insulating layer 23 is trimmed to the end of the frame and the end portion 18 extends away from the electrically insulating layer 23. The end portion 18 is bare and is not surrounded by the electrically insulating layer 23, which has been trimmed off, of the frame 20. The end portion 18 is folded or bent, approximately 180°, to overlap an outer surface 28 of the frame 20. The frame 20 is a resilient material and is elastically deformable.

The socket 14 comprises a socket conductor 24 and a receiving portion 22 into which the plug 10 engages to form the connection. The receiving portion 22 refers to the hollow tube portion of the socket 14. The end portion 18 directly contacts the socket conductor 24 to form an electrical contact. During mating of the connector 10 and socket 14 the frame 20 deflects radially from the axis 13 (downwardly in the Figures) and therefore, being resilient, provides a bias to force the end portion 18 of the solid core connector 16 and the socket conductor 24 into direct contact with one another. The deflection of the frame 20, and intrinsically the electrically insulating layer 23 and the solid core conductor 16, causes a bending moment in these elements and therefore a force on the end portion 18 to provide a good electrical contact with the socket conductor 24.

The socket conductor 24 is formed from a highly conductive material such as copper or other suitably conductive material. In the embodiment shown, the socket connector 24 forms a complete circumference of an inner surface 50 of the receiving portion 22. This is advantageous because the plug 10 and socket 14 may be mated or terminated in any relative orientation thus making fabrication and connection simple. In other words, the plug 10 and socket 14 may connect together throughout 360O of relative angular position. This is highly desirable because manufacturing and mating of the plug 10 and socket 14 is de-skilled and therefore provides very reliable and consistent connections. Advantageously, the end portion 18 may be bent to overlap the outer surface 28 in any position around the circumference of the outer surface 28 and as can be seen in FIG. 4.

The plug 10 uses its solid core conductor 16 from the cable 21 as a direct contact to the plug's socket connector 24. The frame 20 houses the solid core connector 16 and allows the end portion 18 to be folded backwards onto the outside surface 28 of the frame 20. When the contact is terminated by pushing the plug 10 into the socket 14 there is an intentional stack up or interference fit by virtue of the end portion 18 contacting the socket conductor 24 as shown in FIG. 6 in particular. This interference fit causes the frame 20 to deflect like a cantilever beam and uses the reaction force to keep the contact energised after the termination procedure has been completed. The frame 20 is advantageously a thermoplastic material that surrounds the solid core connector 16 and is fed into a rearward surface of the main body 15 of the plug assembly 12 and extends through a forward surface 17 of the main body 15. Alternatively, the frame 20 or frames 20 may be formed as a monolithic part of the main body 15 and the solid core connector 16 may be fed through the frame 20 and to allow a sufficient length of the end portion 18.

Figure 7:
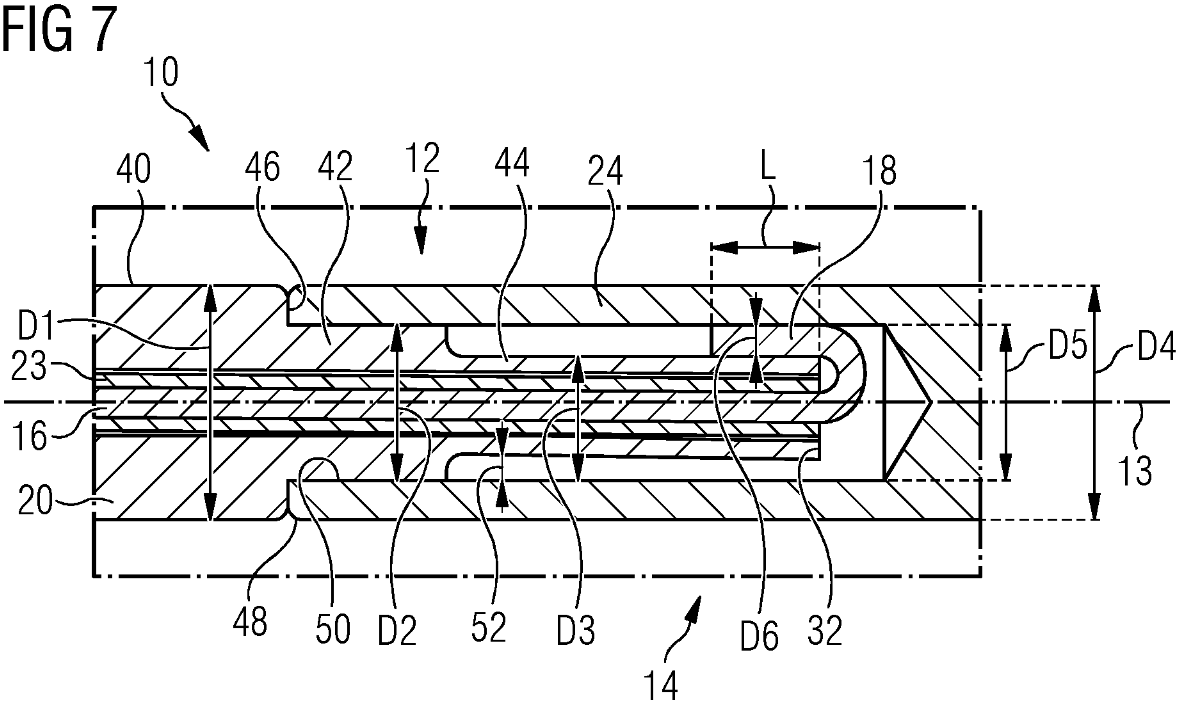
FIG. 7 is a longitudinal section through the connector in accordance with a second embodiment of the present invention.

Referring now to FIG. 7, a second embodiment of the present invention is shown in axial section and where the end portion 18 is shorter than in the FIG. 4 embodiment. A length L of the end portion 18 can be used to control the point of contact, in an axial direction, between the end portion 18 and the socket connector 24. The length L of the end portion 18 that is overlapping the frame 20 enables control of the force being applied by the frame 20 by virtue of the contact position between the end portion 18 and the socket conductor 24 as it acts as a cantilever beam.

FIG. 7 shows further details of the connector assembly 100. The frame 20 has a first portion 40 having a diameter D1, a second portion 42 having a diameter D2 and a third portion 44 having a diameter D3. The first portion 40, the second portion 42 and the third portion 44 are in axial sequence. The third portion 44 comprises the end 32. Optionally, the socket 14 has an outer diameter D4 and which is the same diameter D1 of the first portion 40. A step or riser 46 is formed between the first portion 40 and the second portion 42. The step 46 is abutted by a free end 48 of the socket 14 and which limits how far the plug 12 extends into the socket 14. The second portion 42 and the third portion 44 are radially inward of the receiving portion 22. The inner surface 50 of the receiving portion 22 has a diameter D5 which is very slightly larger than the diameter D2 of the second portion 42 such that the second portion 42 fits snugly into the socket 14, in other words the outer surface of the second portion 42 is in contact with the inner surface 50 of the socket 14. The third portion 44 has a diameter D3 which is smaller than the diameter D5 of the inner surface 50 thereby forming a gap 52 between the outer surface of the third portion 44 and the radially inner surface 50. The gap 52 would otherwise be approximately constant around the circumference of the third portion 44 and inner surface 50 except that the bent and overlapping end portion 18 causes the third portion 44 to deflect such that the gap 52 is not constant around the circumference of the third portion 44 or the frame 20. Indeed, the otherwise constant gap 52 is smaller than the diameter D6 of the end portion 18. The amount diameter D6 is greater than the otherwise constant gap 52 determines the deflection of the third portion 44 and its subsequent biasing force that urges the end portion 18 against the socket contact.

Figure 8:
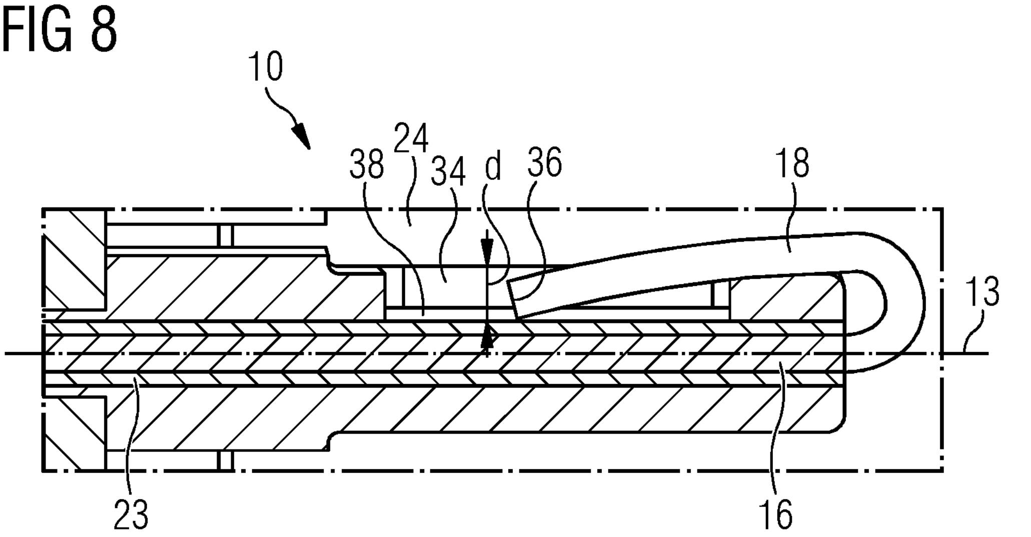
FIG. 8 is a longitudinal section through the connector assembly in accordance with a third embodiment of the present invention.

Referring now to FIG. 8, the frame 20 incorporates a slot 34 in its radially outer surface 38. The slot 34 has a limited circumferential extent that allows the free end 36 of the end portion 18 to fit into such that the free end 36 does not contact the socket connector 24. As shown the slot 34 extends through the end portion 18, in other words the slot 34 is an aperture or through-hole. In another embodiment, the slot 34 may be a groove and which does not extend completely through the thickness of the end portion 18. In another example the slot 34 in the form of the groove may extend around the entire circumference of the frame 20. This slot 34 in the frame 20 allows the end portion 18 of the solid core conductor 16 to be 'oversized' and with its free end 36 within the slot 34 the contact point with the socket connector 24 being in a known position with, therefore, a known biasing force.

The frame 20 and specifically the third portion 44 is designed to provide the energiser or biasing force which keeps a constant and known contact force applied to the termination between the end portion 18 of the solid core connector 16 and the socket connector 24.

A method of manufacturing the connector assembly 100 comprises:

- inserting the cable 21 through the frame 20 to the desired extent such that the cable 21 extends beyond or free of the end 32,
- trimming the electrically insulating layer 23 from the solid core conductor 16 to expose the end portion 18. The electrically insulating layer 23 may be trimmed to the extent of the end 32 of the frame 20,
- deforming the end portion 18 to overlap the frame 20. The end portion 18 may be deformed to overlap the frame 20 in any position around the circumference of the frame 20. The method further comprises the step inserting the plug 10 into the socket 14 such that the frame 20 is deflected and here the frame provides a bias that forces the end portion 18 into contact with the socket conductor 24.

All the features disclosed in this specification (including any accompanying claims, abstract and drawings), and/or all the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A connector assembly for an electrical connection, the connector assembly comprising:

a plug, and a socket, wherein the plug comprises a connector, the connector comprises an axis, a solid core conductor, the solid core conductor has an end portion and a frame, the frame surrounds the solid core conductor except for the end portion, the end portion is deformed to overlap the frame, wherein the socket comprises a socket conductor and a receiving portion into which the plug engages, wherein the end portion directly contacts the socket conductor to form an electrical contact and causes the frame to deflect from the axis and provide a bias to force the end portion and the socket conductor into direct contact with one another, wherein the frame comprises a slot in its radially outer surface, wherein the end portion has a free end, the free end is located at least partly into the slot, and wherein the slot has a depth d sufficient such that the free end does not contact the socket conductor.

2. The connector assembly as claimed in claim 1, wherein the frame comprises a first portion having a diameter D1, a second portion having a diameter D2, and a third portion, wherein the receiving portion comprises a cylindrical inner surface, the inner surface has a diameter D5 which is very slightly larger than the diameter D2 of the second portion such that the second portion fits snugly into contact with the receiving portion, wherein a distance D3 measured from a first side of the inner surface to a furthest side of the third portion normal to the axis plus a thickness D6 of the end portion is smaller than the diameter D5, and wherein engagement of the end portion with the inner surface deflects the third portion in a direction away from the end portion to produce the bias.

3. The connector assembly as claimed in claim 2, wherein a step is formed between the first portion and the second portion, wherein the receiving portion has a free end, and wherein, in a mated condition, the free end abuts the step to limit how far the plug extends into the socket.

4. The connector assembly as claimed in claim 1, wherein the slot extends around a circumference of the frame.

5. The connector assembly as claimed in claim 1, wherein the slot is an aperture in the frame.

6. The connector assembly as claimed in claim 1, wherein the slot is a groove in the frame.

7. The connector assembly as claimed in claim 1, wherein the socket conductor extends around a whole circumference of the receiving portion.

8. The connector assembly as claimed in claim 1, wherein the connector assembly comprises a main body, wherein the plug extends from the main body.

9. The connector assembly as claimed in claim 8, wherein the main body and the plug are monolithic.

10. The connector assembly as claimed in claim 1, wherein the connector assembly comprises an array of plugs.

11. The connector assembly as claimed in claim 8, wherein the plug is formed from a thermoplastic.

12. A method of manufacturing the connector assembly as claimed in claim 1, the method comprising:

deforming the end portion to overlap the frame.

13. The method of manufacturing the connector assembly as claimed in claim 12, further comprising:

inserting the plug into the socket such that the frame is deflected and provides a biasing force that forces the end portion into contact with the socket conductor.

* * * * *